United States Patent
Amrit et al.

(10) Patent No.: US 10,656,606 B2
(45) Date of Patent: May 19, 2020

(54) SYSTEM AND METHOD FOR CONTROLLING RAMP IMBALANCES IN MODEL PREDICTIVE CONTROLLERS

(71) Applicant: SHELL OIL COMPANY, Houston, TX (US)

(72) Inventors: Rishi Amrit, Katy, TX (US); Pierre Christian Marie Carrette, Seria (BN); John Martin Williamson, Houston, TX (US); William Matthew Canney, Fulshear, TX (US)

(73) Assignee: Shell Oil Company, Houston, TX (US)

( * ) Notice: Subject to any disclaimer, the term of this patent is extended or adjusted under 35 U.S.C. 154(b) by 189 days.

(21) Appl. No.: 15/578,084

(22) PCT Filed: Jun. 2, 2016

(86) PCT No.: PCT/US2016/035458
§ 371 (c)(1),
(2) Date: Nov. 29, 2017

(87) PCT Pub. No.: WO2016/196756
PCT Pub. Date: Dec. 8, 2016

(65) Prior Publication Data
US 2018/0150039 A1    May 31, 2018

Related U.S. Application Data

(60) Provisional application No. 62/171,577, filed on Jun. 5, 2015.

(51) Int. Cl.
*G05B 13/04* (2006.01)

(52) U.S. Cl.
CPC .......... *G05B 13/048* (2013.01); *G05B 13/04* (2013.01)

(58) Field of Classification Search
CPC .................. G05B 13/048; G05B 13/04
See application file for complete search history.

(56) References Cited

U.S. PATENT DOCUMENTS

| | | | |
|---|---|---|---|
| 6,272,882 B1 | 8/2001 | Hodges et al. |
| 6,751,527 B2 | 6/2004 | Herzog |
| 7,054,706 B2 | 5/2006 | Kempf et al. |
| 7,194,318 B2 | 3/2007 | Atttarwala |

(Continued)

OTHER PUBLICATIONS

International Search Report and Written Opinion received for PCT Patent Application No. PCT/US2016/035458, dated Sep. 9, 2016, 10 pages.

(Continued)

*Primary Examiner* — Tejal Gami
(74) *Attorney, Agent, or Firm* — James D. Carruth

(57) ABSTRACT

The temporary relaxation of constraints permits the efficient and cost-effective operation of certain process models. Ramp imbalances are controlled using soft-landing constraints. Such soft-landing constraints permit a smooth return to a ramp limit which permits continued operation of a system, such as a petrochemical system that includes several inflows and outflows, as opposed to a forced shutdown of the system. A ramp imbalance may be controlled by determining imbalance ramp rates and imbalance set-point ramp rates and using those constraints to resolve the dynamic control problem of a process model.

2 Claims, 2 Drawing Sheets

(56) References Cited

U.S. PATENT DOCUMENTS

| | | |
|---|---|---|
| 8,103,385 B2 | 1/2012 | Macharia et al. |
| 2009/0149969 A1* | 6/2009 | Slupphaug ............ G05D 7/0635 700/42 |
| 2014/0259886 A1 | 9/2014 | Budaraju et al. |

OTHER PUBLICATIONS

Rawlings et al., "Unreachable Setpoints in Model Predictive Control", IEEE Transactions on Automatic Control, vol. 53, No. 9, 2008, pp. 2209-2215.

Rawlings et al., "Optimizing Process Economic Performance Using Model Predictive Control", Nonlinear Model Predictive Control, 2009, pp. 119-138.

\* cited by examiner

SYSTEM AND METHOD FOR CONTROLLING RAMP IMBALANCES IN MODEL PREDICTIVE CONTROLLERS

PRIORITY CLAIM

The present application is the National Stage (§ 371) of International Application No. PCT/US2016/035458, filed Jun. 2, 2016, which claims priority from U.S. Patent Application No. 62/171,577, filed Jun. 5, 2015 incorporated herein by reference.

TECHNICAL FIELD

The present disclosure relates generally to controlling ramp imbalances in model predictive controllers by allowing temporary relaxation of ramp imbalance constraints when within limits.

BACKGROUND

The present invention relates to a process of controlling ramp imbalances in any number of ramp environments that have an inflow and outflow from one or more systems to one or more other systems, for example, petrochemical environments. In one embodiment, the present disclosure relates to controlling ramp imbalances in the process of liquefying a gaseous, methane-rich feed to obtain a liquefied product (liquefied natural gas).

The liquefaction process includes the steps of:

(a) supplying the gaseous, methane-rich feed at elevated pressure to a first tube side of a main heat exchanger at its warm end, cooling, liquefying and sub-cooling the gaseous, methane-rich feed against evaporating refrigerant to get a liquefied stream, removing the liquefied stream from the main heat exchanger at its cold end and passing the liquefied stream to storage as liquefied product;

(b) removing evaporated refrigerant from the shell side of the main heat exchanger at its warm end;

(c) compressing in at least one refrigerant compressor the evaporated refrigerant to get high-pressure refrigerant;

(d) partly condensing the high-pressure refrigerant and separating in a separator the partly-condensed refrigerant into a liquid heavy refrigerant fraction and a gaseous light refrigerant fraction;

(e) sub-cooling the heavy refrigerant fraction in a second tube side of the main heat exchanger to get a sub-cooled heavy refrigerant stream, introducing the heavy refrigerant stream at reduced pressure into the shell side of the main heat exchanger at its mid-point, and allowing the heavy refrigerant stream to evaporate in the shell side; and (f) cooling, liquefying and sub-cooling at least part of the light refrigerant fraction in a third tube side of the main heat exchanger to get a sub-cooled light refrigerant stream, introducing the light refrigerant stream at reduced pressure into the shell side of the main heat exchanger at its cold end, and allowing the light refrigerant stream to evaporate in the shell side.

International patent application publication No. 99/31448 discloses controlling a liquefaction process by an advanced process controller based on model predictive control to determine simultaneous control actions for a set of manipulated variables in order to optimize at least one of a set of parameters whilst controlling at least one of a set of controlled variables. The set of manipulated variables includes the mass flow rate of the heavy refrigerant fraction, the mass flow rate of the light refrigerant fraction and the mass flow rate of the methane-rich feed. The set of controlled variables includes the temperature difference at the warm end of the main heat exchanger and the temperature difference at the mid-point of the main heat exchanger. The set of variables to be optimized includes the production of liquefied product. The process was considered to be advantageous because the bulk composition of the mixed refrigerant was not manipulated to optimize the production of liquefied product. However, controlling ramp imbalances associated with level and pressure has proven to be cumbersome.

Prior systems addressed the static problem by taking all the controlled variables (CV) and manipulated variables (MV) bounds and imposing a steady state constraint using a process model and optimizing the various objectives that are given to the process model. The objectives may be specified in terms of user-specified values or settings, for example, the set-points or real-time optimization (RTO) targets, or as economic functions which are optimized over the feasible space. The static problem returns a feasible steady state (or steady-state targets), which satisfies the objectives. In dynamic control, the various objectives are set to track these steady-state targets. Due to infeasibility, these steady-state target values of the CVs may differ from the user-specified values (for example, the set-points or RTO targets) or may have a higher economic cost than other possible values within the specified CV limits. This creates the possibility of high potential values within the CV limits which are statically-infeasible.

The steady-state targets are the values where the CVs will stay there unless perturbed. However, under real world conditions these steady-state targets do not remain static and thus the CVs are in transient most of the time due to, for example, noise and un-modeled disturbances. Prior systems, such as those described in the papers J. B. Rawlings, D. Bonne, J. B. Jorgense, A. N. Venkat and S. B. Jorgensen, "Unreachable setpoints in model predictive control," *IEEE Transactions on Automatic Control*, vol. 53, no. 9, pp. 2209-2215, 2008 and J. Rawlings and R. Amrit, "Optimizing process economic performance using model predictive control," *Nonlinear Model Predictive Control*, 2009, pp. 119-138, performed evaluations to determine if any high potential areas existed, opening up a possibility to extract higher cumulative benefits in terms of either vicinity from the user-specified setpoints or economic benefit.

Unstable or ramp behavior in advanced process control design often come from the incorporation of level control of tanks and/or accumulators. Several refining and chemical processes also exhibit unstable behavior, for example, temperature control in partial combustion catalytic crackers. Prior systems exerted very tight control on ramp imbalances which unnecessarily constrained the control problem. For example, prior model-based predictive control (MPC) technologies automatically added an additional constraint that the rate-of-change of the CV had to be zero to the end of the prediction horizon window. In prior MPC environments, specified CVs for a given tank may put too much constraint on production. For example, feeding a tank through an inflow pipe may not be hindered by any constraints but outflow from the tank to another destination tank may impose certain constraints. Each tank has a certain capacity or inventory that is altered by inflows to and outflows from the tank. Because of constraints placed on an inflow or outflow, an imbalance may occur that prevents the efficient operation of the entire system within the given environment. For example, supply from a tank may be stopped if the level of inventory of the tank fell below a certain CV limit even though stopping such supply would cause other systems to exceed or fall below their respective CV limits causing unnecessary delay and expense. Such rigid adherence of the MPC to ramp imbalances is not efficient. In prior systems, an operator may have been required to override the control by the MPC and manually operate the inflow and outflow of the system. Such intervention was sporadic, prone to errors, imposed heavy time burdens, created expenses, and in some circumstances was infeasible due to conditions or the particular environment. The present invention aims to provide temporary relaxation of the ramp imbalance constraints when within certain limits.

SUMMARY

In accordance with the present disclosure, a system and method is herein disclosed for temporary relaxation of the ramp imbalance constraints when within limits. This temporary relaxation is beneficial and technically advantageous, for example, for controlling large tanks with a slow dynamic cycle (for example, when withdrawing inventory during the day and replenishing it at night). The present invention allows for tuning of performance ramps that result in a more predictable overall MPC performance.

In one embodiment, controlling ramp imbalances comprises determine one or more user specified settings. A change current ramp imbalance is also determined. One or more set-point limit trajectories are modified. One or more soft-landing ramp limit time constants and one or more soft-landing set-point limit trajectory time constants are determined. The one or more imbalance ramp rate constraints are determined along with one or more imbalance set-point ramp rate constraints. The static control process problem is then resolved and the one or more ramp constraints are updated. The set-point limit trajectories are also updated and then the dynamic control process problem is resolved.

In one embodiment, the one or more user settings comprise at least one of maximum allowed ramp rate, time to balance ramp, and set-point recovery rate. In another embodiment, the change in the current ramp imbalance is induced by changes in one or more external disturbances affecting one or more ramp variables and also the set-point limit trajectories are modified based, at least in part, on one or more of the change in the current ramp imbalance, specified time to balance, and set-point recovery rate limits.

In another embodiment, the soft-landing ramp limit time constants are based, at least in part, on one or more ramp limits and one or more rate imbalances. The soft-landing set-point limit trajectory time constants are based, at least in part, on one or more set-point limit trajectory time constants and one or more set-point recovery rate limits. Weights may also be imposed on the updated ramp constraints and the updated set-point limit trajectories. In another embodiment resolving the static control process problem is based, at least in part, on user-defined priority settings for one or more constraints.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
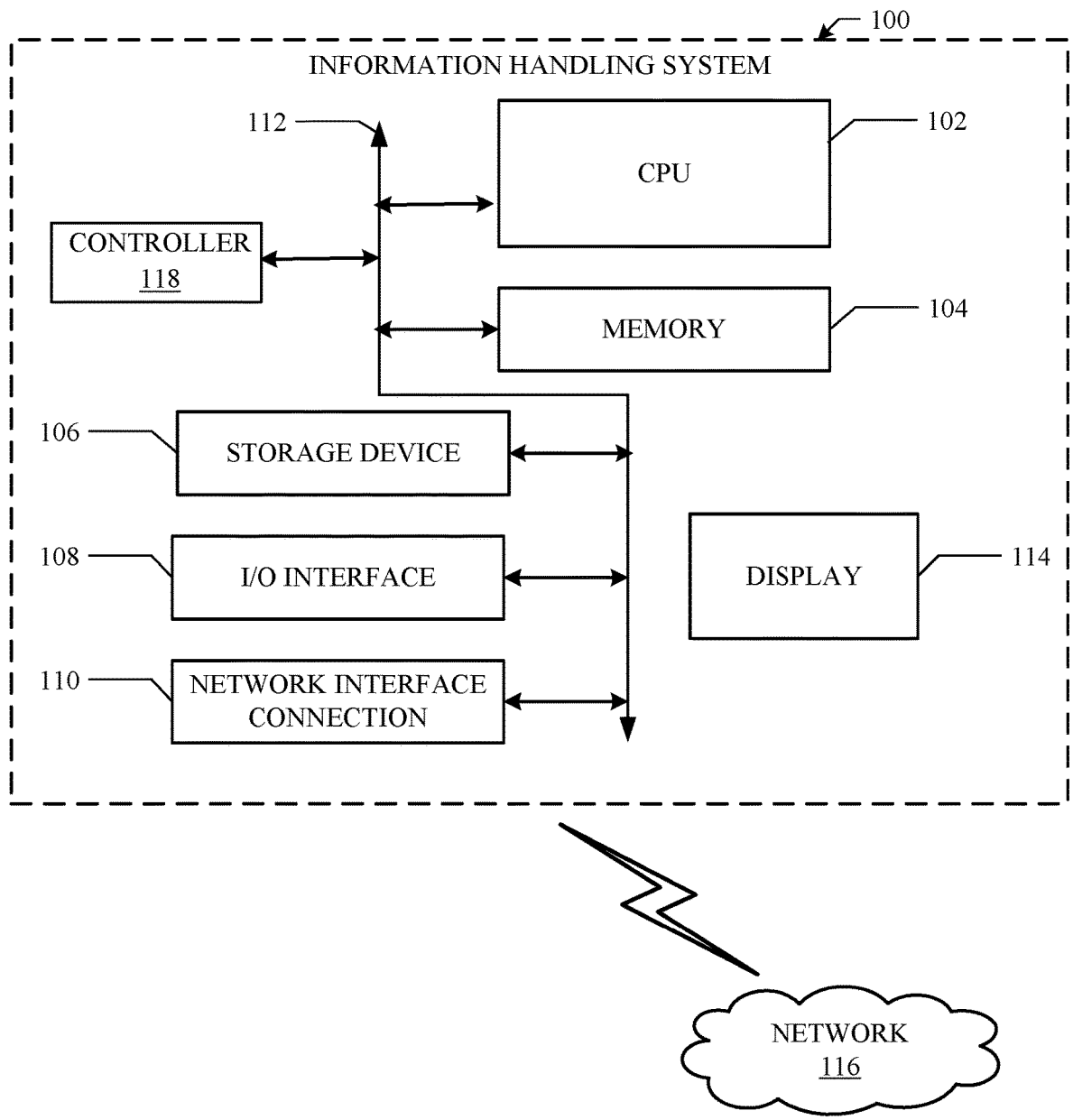
FIG. 1 shows an example information handling system according to one or more embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

The control of an environment with one or more systems, such as a plant that includes several tanks, may include using a controller. In such environments, ramp imbalances often occur where a given system, such as a tank in a petrochemical environment, has an inflow or outflow that exceeds certain limits. For example, the pressure or level of the tank increases or decreases at a ramp rate that exceeds or falls below certain specified limits or constraints. Permitting temporary relaxation of ramp imbalances allows a system to continue operation so that other systems are not affected by the ramp imbalances of a given system.

For example, a tank has a certain capacity (an inventory) whose level can vary between certain limits with a preference to stay not too far from a set-point. Other systems feed inventory into the tank while other systems may extract inventory from the tank (deplete the tank of inventory). The longest settling time for the tank may be measured in hours even though the inventory of the tank can sustain days of extraction (unit production) given certain ranges of depletion rate. Extraction of inventory from the tank results in a level decrease (a downward ramp) while input of inventor to the tank results in a level increase (an upward ramp). However, a ramp imbalance may occur because the rate of inflow or outflow of inventory to the tank is below a set constraint. In one example, continuing to extract inventory from the tank at a current rate would deplete the inventory of the tank but because the capacity of the tank is known, one realizes and can predict that this depletion would take several days and not just a few hours. Instead of stopping the outflow of inventory of the tank completely, one embodiment of the present invention allows for extraction of inventory to continue even though a ramp imbalance exists because it is known that inventory will be input into the tank (the ramp imbalance will not continue) within a time period before the tank would be completely depleted. For example, it may be known that at a set time period a tanker will arrive that will replenish the tank and given the current depletion rate of the tank, the tank will be replenished before it is completed depleted. Thus, allowing a ramp imbalance for a certain time period does not deplete the tank and permits efficient operation of the entire system. A similar example exists for continuing an input of inventory to a tank when extraction from the tank has fallen below a certain level. In such an example, stopping the input of inventory to the tank may affect other upstream systems and processes. If it is known that extraction of the inventory from the tank will resume at a set level in a time period such that the capacity of the tank will not be exceeded, input of the inventory may be permitted to continue even though a ramp imbalance has occurred due to the rate of extraction.

Referring now to the drawings, the details of specific example embodiments are schematically illustrated. Like elements in the drawings will be represented by like numbers, and similar elements will be represented by like numbers with a different lower case letter suffix.

For one or more embodiments of the present invention, an information handling system may be utilized to implement one or more embodiments. Such embodiments may be implemented on virtually any type of information handling system regardless of the platform being used. Such information handling system hardware used to implement one or more of the embodiments described herein may include a processor configured to execute one or more sequences of instructions, programming stances, or code stored on a non-transitory, computer-readable medium. For example, as shown in FIG. 1, an information handling system 100 includes one or more central processing units (CPU) 102, associated memory 104 (for example, random access memory (RAM), read-only memory (ROM), cache memory, flash memory, etc.), a storage device 106 (for example, a hard disk, solid state memory, an optical drive such as a compact disk drive or digital video disk (DVD) drive, a flash memory stick, etc.), and numerous other elements and functionalities typical of today's computers (not shown). The CPU 102 may function to execute program instructions from one or more modules where the program instructions are stored in a memory device such as memory 104 or storage device 106 or any other memory known to one of ordinary skill in the art. The CPU 102 may be configured to execute a controller as contemplated by one or more embodiments of the present invention. The CPU 102 may be a general purpose microprocessor, a microcontroller, a digital signal processor, an application specific integrated circuit (ASIC), a field programmable gate array (FPGA), a programmable logic device, a controller, a state machine, a gated logic, discrete hardware components, an artificial neural network, or any like suitable hardware known to one of ordinary skill in the art that can perform calculations of other manipulations of data according to the present invention. The information handling system 100 may also include an I/O interface 108 for sending and/or receiving inputs, such as inputs from a keyboard, a mouse, or a microphone. I/O interface 108 may also receive information such as multi-dimensional (for example, 3D) geophysical data, one or more values associated with one or more readings, settings, results, variables, feedback (or any other type of data known to one of ordinary skill in the art) from any one or more processes, systems, or external components including such information related to the liquefication of natural gas, or any other information known to one of ordinary skill in the art used in systems for model predictive control. For example, in certain embodiments, I/O interface 108 may receive a rate change, quality control, level, pressure, temperature or any other reading known to one of ordinary skill in the art from a component within the environment. For example, a tank may have a level of inventory and I/O interface 108 may receive a reading associated with the present level or rate change of the level of inventory of the tank. Further, the information handling system 100 may include output means, such as a display 114 (for example, a liquid crystal display (LCD), a plasma display, or cathode ray tube (CRT) monitor). Display 114 comprises the necessary elements to display any type of data necessary for any of the one or more embodiments of the present invention.

The information handling system 100 may be connected to a network 116 (for example, a local area network (LAN), a wide area network (WAN) such as the Internet, or any other similar type of network) via a network interface connection 110 to receive data from sensors, measurements, readings or any other data known to one of ordinary skill in the art as required by any one or more embodiments of the present invention. Those skilled in the art will appreciate that many different types of information handling systems exist, and the aforementioned input and output means may take other forms. Generally speaking, the information handling system includes at least the minimal processing, input, and/or output devices, whether hardware, software or any combination thereof, necessary to practice embodiments of the invention.

The CPU 102 of information handling system 100 may communicate with an application, shown herein as controller 118 and further described below. The application refers to a multivariable model-based predictive control (MPC) application designed to perform advanced process control (APC). A CPU, such as CPU 102, may execute instructions associated with the application including execution of functions, I/O communications, variable and measurement validation, estimation and prediction, steady-state optimization, and control move calculation. The application may contain its own estimation function, but has parameters available for interface and collaboration with other components. Example parameters may include estimator, real-time optimization interface, and other parameters known to one of ordinary skill in the art.

Controller 118 may also be associated with a model, which itself contains a list of input and output variables, and also includes sub-systems, variable sets, economic functions, and tuning and other design and configuration information. The lists of variables for controller 118 and its model must be consistent (for example, when a variable is added or removed from the controller 118, it is also automatically added or removed from the model). Variables in a model are classified as either model inputs or as model outputs. This classification is for modeling purposes only (for example, the mathematics of using measured inputs to produce estimates of process values) and does not necessarily structurally correspond to the physical arrangement of the process being modeled. A significant portion of the design process for controller 118 involves selection of the input and output variables, and development of the model.

In the specification and in the claims the term 'manipulated variable' (MV) is used to refer to variables that can be manipulated by the controller 118, and the term 'controlled variable' (CV) is used to refer to a variable that has to be kept by the advanced process controller at a predetermined value (set point) or within a predetermined range (set range). The term 'disturbance variable' (DV) is used to refer to a variable whose value can change independently of the controller 118 but whose effect is included in the controller model. The term 'intermediate variable' (IV) is used to refer to a variable that is an output of the controller model but which has relationships as an input to other model outputs. The expression "variable sets" is used to refer to a defined group of variables used by a given controller 118 of an application. A given controller 118 may have many variable sets and any variable may be a member of a variable set. However, a variable only appears once in a variable set. The expression 'optimizing a variable' is used to refer to maximizing or minimizing the variable and to maintaining the variable at a predetermined value. The term 'best performance" is used to refer to the most vicinity to a user provided value (set-point/RTO target) or an economically highest profit/lowest cost, whichever is higher priority for given circumstances. The term process output variable (POV) relates to a variable whose value is changed by changes in the process inputs. The term 'best performance value (BPV) is used to refer to the value that would correspond to the best performance within specified CV limits, where the CV limits are the original limits before feasibility recover because relaxation in limits is considered a drop in performance. The BPV values may be computed as a byproduct of the static calculation. The expression 'real-time optimization' is used to refer to an automated process for computing the best economic operating point of a process with given constraints.

Variables in controller 118 can be further classified based on their structural relationship to the process. Process inputs can be classified as MVs (independent process settings which will be adjusted by the controller) or as DVs (independent process settings which will not be adjusted by the controller, and process measurements which are not affected by changes in the MVs). POVs may include as attributes any one or more of CVs, MVs, or TVs or any other attributes known to one of ordinary skill in the art.

Controller MVs may be grouped into sub-systems to optimize their processing. The controller may contain a coordination layer that manages each individual sub-system and ensures proper collaboration between the sub-systems. Controller 118 calculations may include static optimization and dynamic move calculations. Static optimization, in which steady state target values for each CV may be estimated based on current measurements, predicted response, prioritized constraints, and specified (static optimization) economic functions. Dynamic move calculation, in which a current move and a projected move plan for each controller MV is determined based on response tuning and the calculated target values.

Variable Sets provide for grouping CVs for display and for transactional control (for example, changing modes). Economic functions are used to define specific steady-state (or static) optimization objectives for the controller, and determine target values for each CV, consistent with both the full set of CVs and the controller model. A controller's mode is the mode of the associated controller processor. Generally, any operator is allowed to set the controller processor requested mode to inactive, standby, or active while only operators with special permissions, such as a qualified engineer, can request locked mode.

The operator or user should set the requested mode to active for the controller 118 to perform control and optimization using the active operating sets. The operator or user may place the controller 118 in standby when preparing for active mode, or when a short term intervention in the controller's actions is required. The operating sets will remain in their current requested mode when the controller 118 is placed in standby. The operator with special permissions may place the controller 118 in inactive mode if it is desired to inactivate the controller for a longer period; this will automatically return the controller's operating sets and economic functions to inactive.

A user may be any operator, engineer, one or more information handling systems 100 or any other user known to one of ordinary skill in the art.

Further, those skilled in the art will appreciate that one or more elements of the aforementioned information handling system 100 may be located at a remote location and connected to one or more other elements over a network. Further, embodiments of the invention may be implemented on a distributed system having a plurality of nodes, where each portion of the invention may be located on a different node within the distributed system. For example, the display 114 may be located remotely from the other components of the information handling system 100. Information handling system 100 may comprise one or more client devices, servers, or any combination thereof.

Figure 2:
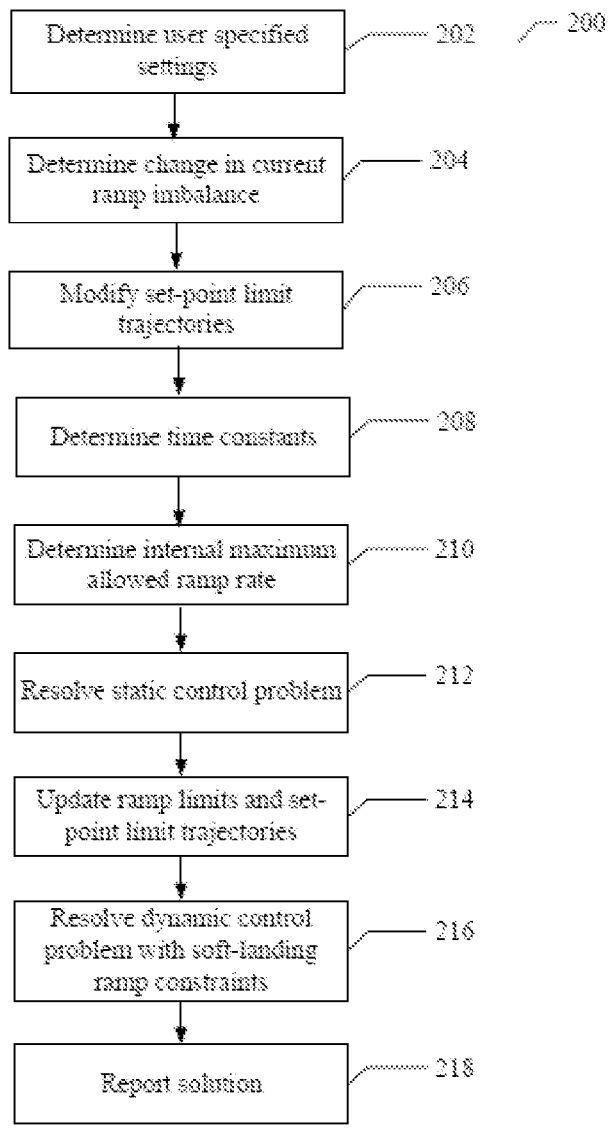
FIG. 2 flow diagram for temporary relaxation of certain constraints when ramp imbalances occur according to one or more embodiments of the present disclosure.

Referring to FIG. 2, depicted generally at 200 is a flow diagram for temporary relaxation of certain constraints when ramp imbalances occur so as to dynamically control ramp imbalances according to one or more embodiments of the present disclosure. At step 202, the user or operator specified settings are determined. The user settings are limits or constraints on the inputs and controlled outputs of a given system or process. The user settings may be stored in memory 104 or storage device 106 or any other type of location known to one of ordinary skill in the art. User settings may include values for maximum allowed ramp rate (up and/or down), time to balance ramp, set-point recovery rate, or any other settings known to one of ordinary skill in the art.

At step 204, the change in current ramp imbalance (or ramp rate) is determined. The ramp imbalance may be induced by, for example, changes in external disturbances affecting one or more ramp variables.

At step 206, the set-point limit trajectories are modified along the dynamic control horizon on the basis of, at least in part, the change in current ramp imbalance ($\Delta$), the specified time to balance ($t_{bal}$) and set-point recovery rate limits ($y_{lo,sp}$ and $y_{hi,sp}$). In one embodiment, the set-point limit trajectories are determined based on the set-point recovery rate limits as shown below:

$$y_{lo,sp} = y_{lo,sp} + \min(t_{bal}\Delta, 0) \text{ and } y_{hi,sp} = y_{hi,sp} + \max(0, t_{bal}\Delta) \quad (1)$$

Next, at step 208, the dynamic control soft-landing ramp limit time constants ($T_{lo}$ and $T_{hi}$) are determined on the basis, at least in part, of the ramp limits ($y_{lo}$ and $y_{hi}$) and the user-defined minimum/maximum ramp rate imbalances ($\delta_{min}^{in}$ and $\delta_{max}^{in}$). Also at step 208, the set-point limit time constants and ($T_{lo,sp}$ and $T_{hi,sp}$) are determined on the basis, at least in part, of the set-point limit trajectory time constants ($T_{lo,sp}$ and $T_{hi,sp}$) and set-point recovery rate limits ($y_{lo,sp}$ and $y_{hi,sp}$). For example, in one embodiment, the dynamic control soft-landing time constants are determined as shown below:

$$T_{lo} = \max(T_{min}, (y_{lo}-y)/\delta_{min}^{in}) \text{ and } T_{hi} = \max(T_{min}, (y_{hi}-y)/\delta_{max}^{in}) \quad (2)$$

$$T_{lo,sp} = \max(T_{min}, (y_{lo,sp}-y)/\delta_{min}^{in}) \text{ and } T_{hi,sp} = \max(T_{min}, (y_{hi,sp}-y)/\delta_{max}^{in}) \quad (3)$$

where ramp limits $y_{lo}$ is $\min(y_{t+k}+T\delta_{t+k})$ and ramp limit $y_{hi}$ is $\max(y_{t+k}+T\delta_{t+k})$, T is a time constraint that determines how fast the ramp rate is driven to zero (or as soon as the soft-landing constraint becomes constraining or active) or rather the time to balance, t is time (or rather a point in time), k is the prediction time, and y is the measured output ramp from the static model (y=Cx+v, where C is a matrix of appropriate dimensions, x is a state of the process model, and v is a non-manipulatable output contribution to the static model). The soft-landing constraint induces a smooth approach to the ramp limit allowing for a temporary relaxation in ramp rate constraints.

At step 210, the internal maximum allowed ramp rate (up or down) associated with the imbalance ramp rate constraints ($\delta_{min,ss}$ and $\delta_{max,ss}$) and imbalance ramp set-point constraints ($\delta_{min,sp,ss}$ and $\delta_{max,sp,ss}$) of the static control problem are determined by using the soft-landing constraint. For example, in one embodiment, the ramp rate constraints and ramp set-point constraints are determined on the basis of at least the time constants, set-point recovery limits and control horizon h as shown below:

$$\delta_{min,ss}=(y_{lo}-y)/\max(T_{lo},h) \text{ and } \delta_{max,ss}=(y_{hi}-y)/\max(T_{hi},h) \quad (4)$$

$$\delta_{min,sp,ss}=(y_{lo,sp}-y)/\max(T_{lo,sp},h) \text{ and } \delta_{max,sp,ss}=(y_{hi,sp}-y)/\max(T_{hi,sp},h) \quad (5)$$

At step 212, the static control problem is resolved. In one embodiment, the static control problem is resolved by using the imbalance ramp rate constraints and imbalance ramp set-point constraints set forth in step 210 and shown in Equations (4) and (5). In one embodiment, the static control problem is resolved by imposing imbalance ramp rate constraints at a priority lower than the rate ramp limits ($y_{lo}$ and $y_{hi}$) and imposing imbalance ramp set-point constraints at a priority higher than the ramp set-point limits ($y_{lo,sp}$ and $y_{hi,sp}$). The priority for each constraint may be a user-defined setting.

At step 214, the ramp limits ($y_{lo}$ and $y_{hi}$) and set-point limit trajectories are updated based at least in part on the prediction time ramp rate ($\delta_k$) and the set-point recovery rate ($\delta_r$). In one embodiment, the updated ramp limits (still referred to as $y_{lo}$ and $y_{hi}$) and updated set-point recovery limits ($y_{lo,sp,k}$ and $y_{hi,sp,k}$) are determined as shown below:

$$y_{lo} \leq y_k + T_{lo}\delta_k \text{ and } y_k + T_{hi}\delta_k \leq y_{hi} \quad (6)$$

$$y_{lo,sp,k} \leq y_k + T_{lo,sp}\delta k \text{ and } y_k + T_{hi,sp}\delta_k \leq y_{hi,sp,k} \quad (7)$$

where $$y_{lo,sp,k}=\min(y_{lo,sp}+k\delta_r,y_{sp}) \text{ and } y_{hi,sp,k}=\max(y_{sp},y_{hi,sp}-k\delta_r) \quad (8)$$

At step 216, the dynamic control problem is resolved using the updated ramp limits and updated set-point recovery limits. In one embodiment, ramp limit weights and set-point limit weights are imposed on the updated ramp limits and the updated set-point recovery limits, respectively.

At step 218, the solution of the dynamic control problem is reported.

While the embodiments are described with references to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fail within the scope of the inventive subject matter.

That which is claimed is:

1. A method for controlling ramp imbalances in a model predictive controller by allowing temporary relaxation of ramp imbalance constraints when within limits to better control a petrochemical process, comprising:

determining user specified settings comprising minimum/maximum allowed ramp rates ($\delta^{in}_{min}$, $\delta^{in}_{max}$), time to balance ($t_{bal}$), and set-point recovery rate ($\delta_r$);

determining a change ($\Delta$) in current ramp imbalance induced by changes in one or more external disturbance affecting one or more ramp variables;

modifying low ($y_{lo,sp}$) and high ($y_{hi,sp}$) set-point limits in accordance with $y_{lo,sp}=y_{lo,sp}+\min(t_{bal}\Delta,0)$ and $y_{hi,sp}=y_{hi,sp}+\max(0,t_{bal}\Delta)$;

determining soft-landing ramp limit time constants ($T_{lo}$ and $T_{hi}$) based on ramp limits ($y_{lo}$ and $y_{hi}$) and the user-defined minimum/maximum allowed ramp rates in accordance with $T_{lo}=\max(T_{min},(y_{lo}-y)/\delta^{in}_{min})$ and $T_{hi}=\max(T_{min},(y_{hi}-y)/\delta^{in}_{max})$ where y is a current ramp and $T_{min}$ is a minimum time constant that determines how fast the ramp rate may be driven to zero;

determining soft-land set-point limit time constants ($T_{lo,sp}$ and $T_{hi,sp}$) in accordance with $T_{lo,sp}=\max(T_{min},(y_{lo,sp}-y)/\delta^{in}_{min})$ and $T_{hi,sp}=\max(T_{min},(y_{hi,sp}-y)/\delta^{in}_{max})$;

determining imbalance ramp rate constraints ($\delta_{min,ss}$ and $\delta_{max,ss}$) in accordance with $\delta_{min,ss}=(y_{lo}-y)/\max(T_{lo},h)$ and $\delta_{max,ss}=(y_{hi}-y)/\max(T_{hi},h)$ where h is the dynamic control horizon;

determining imbalance set-point ramp rate constraints ($\delta_{min,sp,ss}$ and $\delta_{max,sp,ss}$) in accordance with $\delta_{min,sp,ss}=(y_{lo,sp}-y)/\max(T_{lo,sp},h)$ and $\delta_{max,sp,ss}=(y_{hi,sp}-y)/\max(T_{hi,sp},h)$;

resolving static control process problem by imposing the determined imbalance ramp rate constraints ($\delta_{min,ss}$ and $\delta_{max,ss}$) at a priority higher than the ramp limits ($y_{lo}$ and $y_{hi}$) and imposing the determined imbalance set-point ramp rate constraints ($\delta_{min,sp,ss}$ and $\delta_{max,sp,ss}$) at a priority higher than the ramp set point limits ($y_{lo,sp}$ and $y_{hi,sp}$);

updating constraints for the ramp limits ($y_{lo}$ and $y_{hi}$) in accordance with $y_{lo} \leq y_k + T_{lo}\delta_k$ and $y_k + T_{hi}\delta_k \leq y_{hi}$ where k is a prediction time and $\delta_k$ is a ramp rate at the prediction time;

updating constraints for the set-point limit trajectories in accordance with $y_{lo,sp,k} \leq y_k + T_{lo,sp}\delta_k$ and $y_k + T_{hi,sp}\delta_k \leq y_{hi,sp,k}$ where set-point limit trajectories ($y_{lo,sp,k}$ and $y_{hi,sp,k}$) are defined as $y_{lo,sp,k}=\min(y_{lo,sp}+k\delta_r,y_{sp})$ and $y_{hi,sp,k}=\max(y_{sp},y_{hi,sp}-k\delta_r)$;

resolving a dynamic control process problem using said updates; and controlling the ramp imbalances in the model predictive controller by said ramp imbalance constraints to better control the petrochemical process.

2. A system comprising:

one or more processors for processing information;

a memory communicatively coupled to the one or mom processors; and one or more modules that comprise instructions stored in the memory, the instructions, when executed by the processor, operable to perform calculations of a static control problem and a dynamic control problem comprising:

determining user specified settings comprising minimum/maximum allowed ramp rates ($\delta^{in}_{min}$, $\delta^{in}_{max}$), time to balance ramp ($t_{bal}$), and set-point recovery rate ($\delta_r$);

determining a change ($\Delta$) in a current ramp imbalance induced by changes in one or more external disturbances affecting one or more ramp variables;

modifying low ($y_{lo,sp}$) and high ($y_{hi,sp}$) set-point limits in accordance with $y_{lo,sp}=y_{lo,sp}+\min(t_{bal}\Delta,0)$ and $y_{hi,sp}=y_{hi,sp}+\max(0,t_{bal}\Delta)$;

determining soft-landing ramp limit time constants ($T_{lo}$ and $T_{hi}$) based on ramp limits ($y_{lo}$ and $y_{hi}$) and the user-defined minimum/maximum allowed ramp rates in accordance with $T_{lo}=\max(T_{min},(y_{lo}-y)/\delta^{in}_{min})$ and $T_{hi}=\max(T_{min},(y_{hi}-y)/\delta^{in}_{max})$ where y is a current ramp and $T_{min}$ is a minimum time constant that determines how fast the ramp rate may be driven to zero;

determining soft-land set-point limit time constants ($T_{lo,sp}$ and $T_{hi,sp}$) in accordance with $T_{lo,sp}=\max(T_{min},(y_{lo,sp}-y)/\delta^{in}_{min})$ and $T_{hi,sp}=\max(T_{min},(y_{hi,sp}-y)/\delta^{in}_{max})$;

determining imbalance ramp rate constraints ($\delta_{min,ss}$ and $\delta_{max,ss}$) in accordance with $\delta_{min,ss}=(y_{lo}-y)/\max(T_{lo},h)$ and $\delta_{max,ss}=(y_{hi}-y)/\max(T_{hi},h)$ where h is the dynamic control horizon;

determining imbalance set-point ramp rate constraints ($\delta_{min,sp,ss}$ and $\delta_{max,sp,ss}$) in accordance with $\delta_{min,sp,ss}=(y_{lo,sp}-y)/\max(T_{lo,sp},h)$ and $\delta_{max,sp,ss}=(y_{hi,sp}-y)/\max(T_{hi,sp},h)$;

resolving static control process problem by imposing the determined imbalance ramp rate constraints ($\delta_{min,ss}$ and $\delta_{max,ss}$) at a priority higher than the ramp limits ($y_{lo}$ and $y_{hi}$) and imposing the determined imbalance set-point ramp rate constraints ($\delta_{min,sp,ss}$ and $\delta_{max,sp,ss}$) at a priority higher than the ramp set point limits ($y_{lo,sp}$ and $y_{hi,sp}$);

updating constraints for the ramp limits ($y_{lo}$ and $y_{hi}$) in accordance with $y_{lo} \leq y_k + T_{lo}\delta_k$ and $y_k + T_{hi}\delta_k \leq y_{hi}$ where k is a prediction time and $\delta_k$ is a ramp rate at the prediction time;

updating constraints for the set-point limit trajectories in accordance with $y_{lo,sp,k} \leq y_k + T_{lo,sp}\delta_k$ and $T_{hi,sp}\delta_k \leq y_{hi,sp,k}$ where set-point limit trajectories ($y_{lo,sp,k}$ and $y_{hi,sp,k}$) are defined as $y_{lo,sp,k}=\min(y_{lo,sp}+k\delta_k,y_{sp})$ and $y_{hi,sp,k}=\max(y_{sp},y_{hi,sp}-k\delta_r)$;

resolving a dynamic control process problem using said updates; and controlling the ramp imbalances in the model predictive controller by said ramp imbalance constraints to better control the petrochemical process.

* * * * *